US007295404B2

(12) United States Patent
Inamura et al.

(10) Patent No.: US 7,295,404 B2
(45) Date of Patent: Nov. 13, 2007

(54) MAGNETIC RECORDING MEDIUM FOR PERPENDICULAR RECORDING AND MAGNETIC STORAGE APPARATUS USING THE SAME

(75) Inventors: Ryosaku Inamura, Kawasaki (JP); Kazumasa Shimoda, Kawasaki (JP); Toshio Sugimoto, Kawasaki (JP); Takuya Uzumaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/699,707

(22) Filed: Jan. 30, 2007

(65) Prior Publication Data

US 2007/0124749 A1 May 31, 2007

Related U.S. Application Data

(63) Continuation of application No. 10/718,202, filed on Nov. 20, 2003, which is a continuation of application No. PCT/JP01/04317, filed on May 23, 2001.

(51) Int. Cl.
*G11B 5/66* (2006.01)

(52) U.S. Cl. ........................ 360/135; 428/832; 428/840

(58) Field of Classification Search ................ 360/133, 360/313, 135; 720/718; 428/694 T, 694 TP, 428/694 TM, 694 TS, 826, 832, 840
See application file for complete search history.

(56) References Cited

U.S. PATENT DOCUMENTS

| 4,277,809 | A | * | 7/1981 | Fisher et al. ................ 360/131 |
| 5,168,482 | A | * | 12/1992 | Aratani et al. ........... 369/13.05 |
| 5,372,843 | A | | 12/1994 | Miyamura et al. |
| 5,503,911 | A | | 4/1996 | Aoki et al. |
| 5,585,986 | A | | 12/1996 | Parkin |
| 5,663,935 | A | | 9/1997 | Nishimura |
| 5,792,564 | A | | 8/1998 | Hikosaka et al. |
| 5,815,342 | A | | 9/1998 | Akiyama et al. |
| 6,383,668 | B1 | | 5/2002 | Fullerton et al. |
| 6,387,483 | B1 | | 5/2002 | Hokkyo et al. |
| 6,541,131 | B1 | | 4/2003 | Ristau |
| 6,667,848 | B1 | | 12/2003 | Khizroev et al. |
| 6,671,117 | B2 | | 12/2003 | Dimitrov et al. |
| 6,709,773 | B1 | | 3/2004 | Chang et al. |
| 6,716,516 | B2 | | 4/2004 | Futamoto et al. |
| 6,804,175 | B2 | * | 10/2004 | Ruigrok et al. .......... 369/13.55 |
| 6,875,527 | B2 | * | 4/2005 | Sugimoto et al. ........... 428/828 |
| 2001/0009730 | A1 | * | 7/2001 | Futamoto et al. .... 428/694 TM |

FOREIGN PATENT DOCUMENTS

| JP | 2-227814 | 9/1990 |
| JP | 10-289434 | 10/1998 |
| JP | 2001-101644 | 4/2001 |
| WO | WO99/08262 | 2/1999 |

* cited by examiner

*Primary Examiner*—Brian E. Miller
(74) *Attorney, Agent, or Firm*—Greer, Burns & Crain, Ltd.

(57) ABSTRACT

A perpendicular magnetic recording medium at least comprises a perpendicular magnetic recording layer and a backing layer backing the perpendicular magnetic recording layer. The backing layer has an in-plane magnetization and is formed of a ferrimagnetic material having a compensation temperature in the vicinity of a recording/reproducing temperature in which reproducing of magnetic information is made from the perpendicular magnetic recording layer. A magnetic storage apparatus for recording and reproducing magnetic information using the perpendicular magnetic recording medium is also disclosed.

7 Claims, 6 Drawing Sheets

|  | conventional 2-layer medium | present 2-layer medium |
|---|---|---|
| noise caused by magnetic recording layer | yes | yes |
| noise caused by backing layer | yes | no |

MAGNETIC RECORDING MEDIUM FOR PERPENDICULAR RECORDING AND MAGNETIC STORAGE APPARATUS USING THE SAME

This is a continuation of application Ser. No. 10/718,202, filed Nov. 20, 2003, which is a continuation of International PCT application Ser. No. PCT/JP01/04317, filed May 23, 2001.

TECHNICAL FIELD

The present invention relates to magnetic recording medium such as hard disk, and the like, and further to a magnetic storage apparatus that performs recording and reproducing of magnetic information by using such a magnetic recording medium. Currently, most of the magnetic recording media used in practice are the type called in-plane recording type, in which magnetic information is recorded in the magnetic recording layer in the form of in-plane magnetization. In such a magnetic recording medium, the recording density has been increased with a rate of double per year.

However, there is a demand for the storage device having even larger capacity, and various investigations have been made about the technology capable of meeting for such a demand.

BACKGROUND ART

In view of the continuous trend of technology of increasing the capacity of hard disk devices, the magnetic recording medium of perpendicular recording type is rated as the most promising high density magnetic recording technology of the next generation. Thus, intensive research and development have been carried out actively in recent years with regard to such a magnetic recording medium of perpendicular recording type.

The magnetic recording medium of perpendicular recording type can be classified into two types, the one being a magnetic recording medium of single-layer type having a single magnetic layer for the magnetic recording layer, another being a magnetic recording medium of two-layer type having a backing layer in addition to the magnetic recording layer. The backing layer works as an assist layer at the time of writing information.

In this two-layer type magnetic recording medium, the backing layer is disposed so as to back the magnetic recording layer from below. Because of the predetermined magnetization of the backing layer, the recording magnetic field in the perpendicular direction is increased at the time of recording, and ideal perpendicular recording becomes possible. For this reason, special attention has been paid to the two-layer type magnetic recording medium as the magnetic recording medium suited for the high density recording.

In order to achieve high density magnetic recording, it is very important to reduce the noise. On the other hand, it should be noted that the backing layer of the foregoing two-layer type magnetic recording medium is generally formed with a ferromagnetic material such as FeTaC, NiFe, and the like. When such ferromagnetic material is used for the backing layer, there arises a problem in that noise larger than the noise originating from the magnetic recording layer is caused by the backing layer.

Thereupon, improvements have been made conventionally on the material, and the like, so as to reduce the noise originating from the backing layer. However, a backing layer is required to have a predetermined magnetization in order that the backing layer performs its function. As long as the backing layer has its own magnetization like this, it is difficult to completely remove the noise originating from the backing layer. Further, there has been no satisfactory proposal so far for reducing the noise securely.

As noted before, the original role of the backing layer provided underneath the magnetic recording layer in the two-layer type magnetic recording medium is to assist the recording (writing) of the magnetic information, and for this purpose, it is necessary that the backing layer has a predetermined magnetization. However, such a construction causes the problem of forming noise (spike noise, and the like) originating from the backing layer at the time of reproducing (reading) magnetic information from the magnetic recording layer.

Thus, the backing layer provided to assist the magnetic recording layer is required to satisfy conflicting requirements imposed at the time of recording and imposed at the time of reproducing. Conventionally, there has been no magnetic recording medium of two-layer type capable of satisfying these requirements.

Therefore, the main object of the present invention is to provide a magnetic recording medium of two-layer type comprising a magnetic recording layer and a backing layer assisting recording into the magnetic recording layer, wherein it is possible to suppress the noise originating from the backing layer at the time of reproducing. Further, the present invention has an object of providing a magnetic storage apparatus enabling recording of large-capacity magnetic information by using such a magnetic recording medium.

DISCLOSURE OF THE INVENTION

The above-mentioned purpose is achieved by:

a magnetic recording medium of perpendicular recording type comprising at least a perpendicular magnetic recording layer and a backing layer having an in-plane magnetization and backing said perpendicular magnetic recording layer, said backing layer is formed of a ferrimagnetic material having a compensation temperature in the vicinity of a recording/reproducing temperature used for reproducing magnetic information from the perpendicular magnetic recording layer.

In the foregoing magnetic recording medium, it becomes possible to control the backing layer such that the backing layer has a magnetization when magnetic information is recorded into the perpendicular magnetic recording layer and such that the backing layer does not have magnetization when magnetic information is read out from the perpendicular magnetic recording layer. With this, it becomes possible to suppress the noise originating from the backing layer, and a magnetic recording medium suitable for high density magnetic recording is obtained.

The recording/reproducing temperature may be chosen from the range of 0-100° C., for example, in consideration of the environment in which the magnetic recording medium is used. Further, the foregoing compensation temperature may be set to a temperature in the vicinity of the recording/reproducing temperature specified above.

For the foregoing ferrimagnetic material, it is possible to use a GdFe alloy, a DyFe alloy or garnet ferrite. Thereby, it becomes possible to adjust the compensation temperature by changing the composition of the ferrimagnetic material.

For the perpendicular magnetic recording layer, it is possible to use a single-layer perpendicular magnetization film or a multilayer perpendicular magnetization film.

Further, the present invention includes also a magnetic storage apparatus that causes the foregoing magnetic recording medium of the perpendicular recording type to function with certainty.

Thus, the present invention achieves its object also by a magnetic storage apparatus for recording and reproducing magnetism information, provided with a magnetic recording medium of perpendicular recording type, said magnetic recording medium comprising at least a perpendicular magnetic recording layer and a backing layer backing said perpendicular magnetic recording layer, said backing layer having a magnetization in an in-plane direction, said backing layer being formed of a ferrimagnetic material having a compensation temperature in the vicinity of a recording/reproducing temperature, said magnetic storage apparatus being further provided with a temperature control unit, said temperature control unit increasing or decreasing a temperature of said backing layer so as to depart from said compensation temperature when recording magnetic information into said perpendicular magnetic recording layer.

It should be noted that said temperature control means may be formed of an optical heating mechanism heating said backing layer with an optical beam when recording magnetic information into said perpendicular magnetic recording layer.

Also, it is possible to use a single magnetic pole magnetic head for the recording head for recording the magnetic information into the foregoing perpendicular magnetic recording layer. Further, it is desirable to make the structure to have a return yoke that receives the recording magnetic field from the above-mentioned recording head through the backing layer.

Furthermore, it is more desirable to construct the magnetic storage device such that a reproducing head such as the one using a magneto-resistive sensor such as GMR, TMR, MR etc. is provided adjacent to the foregoing recording head for reproducing the magnetic information from the perpendicular magnetic recording layer.

BEST MODE FOR IMPLEMENTING THE INVENTION

Hereinafter, a magnetic recording medium of perpendicular recording type (referred to hereinafter simply as magnetic recording medium) of the present invention will be explained in detail with reference to the drawings.

Figure 1A:
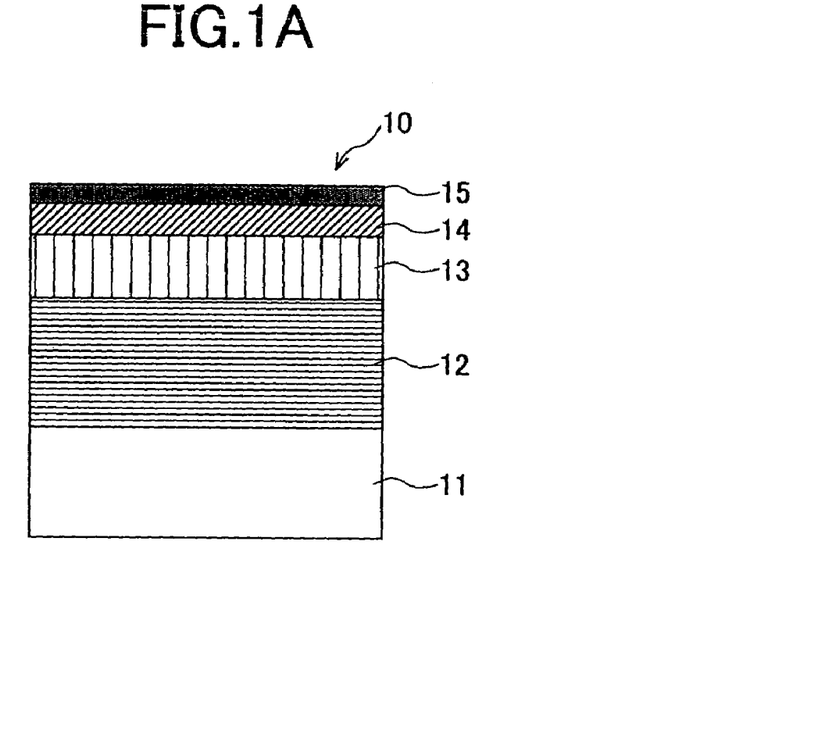
FIGS. 1A and 1B are diagrams showing examples of the magnetic recording medium of the perpendicular recording type according to the present invention.
Figure 1B:
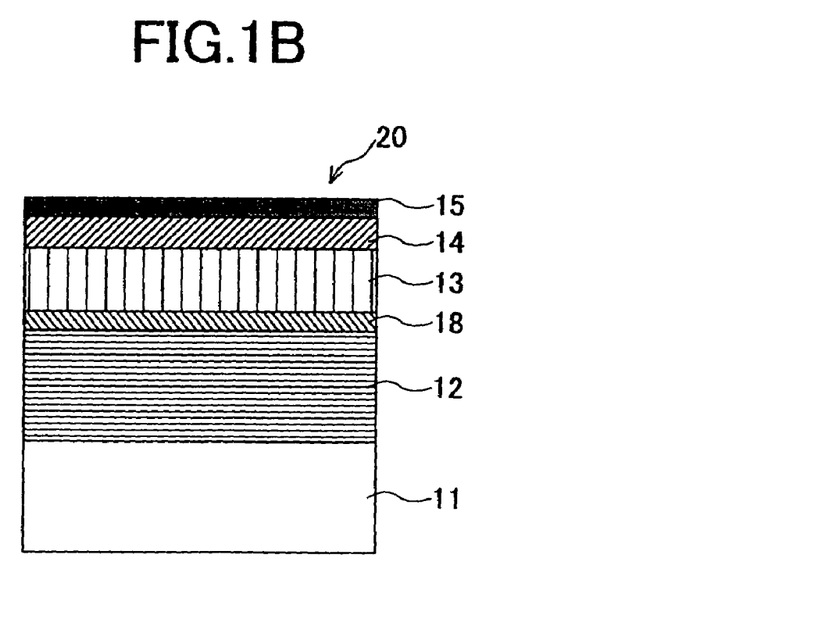

FIGS. 1A and 1B are diagrams showing examples of the magnetic recording medium according to the present invention, wherein FIG. 1A shows a magnetic recording medium 10 not provided with a non-magnetic layer, while FIG. 1B shows a magnetic recording medium 20 provided with such a non-magnetic layer.

Referring to FIG. 1A, the magnetic recording medium 10 has a structure in which a backing layer 12, a magnetic recording layer 13, a protection layer 14 and a lubrication layer 15 are stacked consecutively on a glass substrate 11. The magnetic recording medium 10 may be formed by consecutively stacking each of the layers with respective, predetermined thickness by using a thin film formation technology such as sputtering process, evaporation deposition process, plating process, and the like used for semiconductor fabrication process.

It should be noted that the foregoing recording layer 13 is formed of a perpendicular magnetization recording film having a magnetization in a perpendicular direction to the surface of substrate 11. Such a magnetic recording layer 13 is formed on the backing layer 12 by conducting a deposition process while supplying a perpendicular magnetic field to the substrate 11 surface.

This magnetic recording layer 13 may be formed of a single perpendicular magnetization film as shown in FIG. 1A or by a multilayer perpendicular magnetization film. In the case of using a single layer film, the magnetic recording layer 13 may be formed by using an alloy of the CoCr system or an amorphous material such as TbFeCo. In the case of forming the layer 13 by a multilayer film, it is possible to use a stacked perpendicular magnetization film such as Co/Pd, Co/Pt, Fe/Pt, and the like. perpendicular magnetization film that stacked.

It should be noted that the above-mentioned backing layer 12 is disposed so as to assist the recording of magnetic information to the magnetic recording layer 13. Although the backing layer 12 is formed also with a magnetic material, the magnetization direction is set to the in-plane direction parallel to the substrate 11 surface in the backing layer 12, contrary to the magnetic recording layer 13 formed thereon. By adopting such a construction, the recording magnetic field from the record head is applied to magnetic recording layer 13 perpendicularly, and exact record magnetic recording is achieved. Thus, by providing the backing layer 12 having a specified magnetization under magnetic recording layer 13, the backing layer 12 receives the recording magnetic field, and recording of the magnetic information to magnetic recording layer 13 is conducted with reliability. About the recording of the magnetic information to the magnetic recording layer 13, explanation will be made later with reference to FIG. 3.

Hereinafter, explanation will be made about the magnetic material used in the above backing layer 12. It should be noted that the backing layer 12 becomes the state having a predetermined magnetization when recording of magnetic information is to be made into the magnetic recording layer 13. On the other hand, the magnetization should become zero or to the state in which the magnetization is sufficiently attenuated such that the magnetization does not became the cause of noise when the magnetic information recorded in the magnetic recording layer 13 is to be reproduced. The backing layer 12 that changes the magnetic properties like this can be provided by a ferrimagnetic material.

Figure 2:
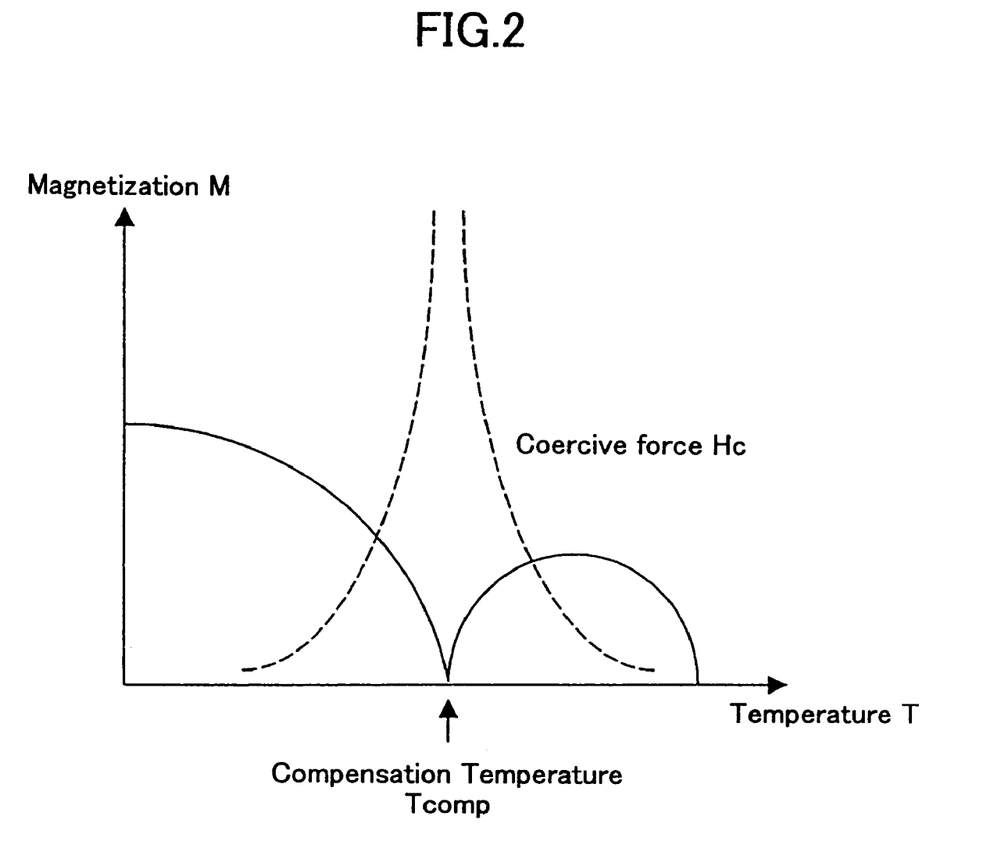
FIG. 2 is a diagram showing the temperature characteristics of the ferrimagnetic material of N type.

FIG. 2 is a diagram showing the temperature characteristics of a ferrimagnetic material called N type.

Referring to FIG. 2, perpendicular axis represents the temperature T, while the horizontal axis represents the magnetization M. From FIG. 2, it can be seen that the ferrimagnetic material of N type has a temperature dependence such that the magnetization M (magnetic property) changes with the temperature. Thus, it will be seen that there exists a temperature in a ferrimagnetic material of N type in which an apparent magnetization M disappears more or less when the temperature T goes up from a low temperature. The temperature in which the magnetization M becomes zero is called compensation temperature $T_{comp}$. Magnetization M appears once again when the temperature goes up further than this compensation temperature $T_{comp}$. Thus, by forming the backing layer 12 by a ferrimagnetic material of N type, it becomes possible to control the magnetization state of the backing layer 12 by the temperature.

Thus, by designing a ferrimagnetic material such that the ferrimagnetic material has a compensation temperature $T_{comp}$ in the vicinity of the recording/reproducing temperature, or the temperature in which the magnetic information is reproduced from the magnetic recording layer 13, and by using such a ferrimagnetic material for the backing layer 12, it becomes possible to control the formation of noise from the backing layer 12 at the time of reproduction.

It is desirable to use the alloy of NdFe system, GdFe system or DyFe system, or a garnet ferrite for the ferrimagnetic material in order to realize the above-noted backing layer 12. These materials can adjust the compensation temperature $T_{comp}$ by changing the compositional ratio.

Thus, a magnetic recording medium capable of suppressing noise can be obtained by designing the ferrimagnetic material such that the compensating temperature $T_{comp}$ of the ferrimagnetic material exists in the vicinity of the recording/reproducing temperature of the magnetic recording medium, which recording/reproducing temperature being the temperature of the magnetic recording medium at the time of reproducing the magnetic information from the magnetic recording layer 13, and by using the ferrimagnetic material for the backing layer 12.

Thereby, the recording/reproducing temperature may be chosen from the range of −20-100° C., by taking into consideration the room temperature in which the magnetic recording apparatus is provided and the temperature rise occurring inside the magnetic storage apparatus.

At the time of recording the magnetic information to the magnetic recording layer 13, on the other hand, it is necessary that the backing layer 12 has a predetermined magnetization as noted before.

Thus, when conducting recording into the magnetic information, the temperature of the backing layer 12 is changed away from the compensation temperature $T_{comp}$ by heating or cooling the backing layer. This may be cased by providing heating means or cooling means, i.e., a temperature changing means, for heating or cooling the backing layer in the magnetic storage apparatus. As can be seen clearing in FIG. 2, the backing layer 12 starts to have magnetization M when the temperature of the backing layer 12 is offset from the foregoing compensating temperature $T_{comp}$. Thus, any of cooling and heating may be used.

For example, the backing layer 12 can be heated easily by providing a heating mechanism, which may be the one that uses an optical beam, and the like, and disposed in the vicinity of the magnetic recording medium. In this case, magnetization is induced in the backing layer 12 when recording magnetic information on the magnetic recording layer 13 by heating the magnetic recording medium by the optical beam used as an optical assist. Further, by reducing the coercive force, the backing layer 12 can function its original role.

It should be noted that FIG. 1A shows the example in which the backing layer 12 is formed of a single ferrimagnetic layer, while the present invention is not limited to such a construction and it is also possible to use a multilayer film having ferrimagnetic coupling. In this case, it is sufficient to adjust such that the multilayer film as a whole does not show magnetization at the temperature in the vicinity of the recording/reproducing temperature.

Finally, a material of carbon system is formed on the magnetic recording layer 13 as a protection film 14, and a lubrication layer 15 is formed thereon by applying perfluoroether, and the like, followed by natural drying process. With this, the magnetic recording medium 10 shown in FIG. 1A is obtained.

In the example of the magnetic recording medium 10 shown in FIG. 1A, it should be noted that the backing layer 12 is formed by forming a film of GdFeCo on the glass substrate 11 with a thickness of 400 nm, and the magnetic recording layer 13 is formed by depositing a film of CoCrPt on the backing layer 12 with a thickness of 40 nm. Further, a DLC (diamond-like carbon) film is formed on the magnetic layer 13 as the protection film 14 with the thickness of 5 nm.

It should be noted that the magnetic recording medium 20 shown in FIG. 1B is different from the magnetic recording medium 10 of FIG. 1A in the point that a non-magnetic layer 18 is provided between the backing layer 12 and the magnetic recording layer 13. Otherwise, the magnetic recording medium 20 has a construction similar to that of the magnetic recording medium 10 shown in FIG. 1A. By providing such a non-magnetic layer 18 as such, crystal orientation or the state of crystal grains of the magnetic recording layer 13 formed thereon can be improved. This non-magnetic layer 18 can be formed by using a non-magnetic material of the system of Ti, Cr or TiCr and may be formed in the form of single layer film or also in the form of multilayer film. The construction of the magnetic recording medium 20 of FIG. 1B is similar to that of the magnetic recording medium 10 shown in FIG. 1A, except that a non-magnetic layer of TiCr is provided between backing layer 12 and the magnetic recording layer 13 with the thickness of 20 nm.

Figure 3A:
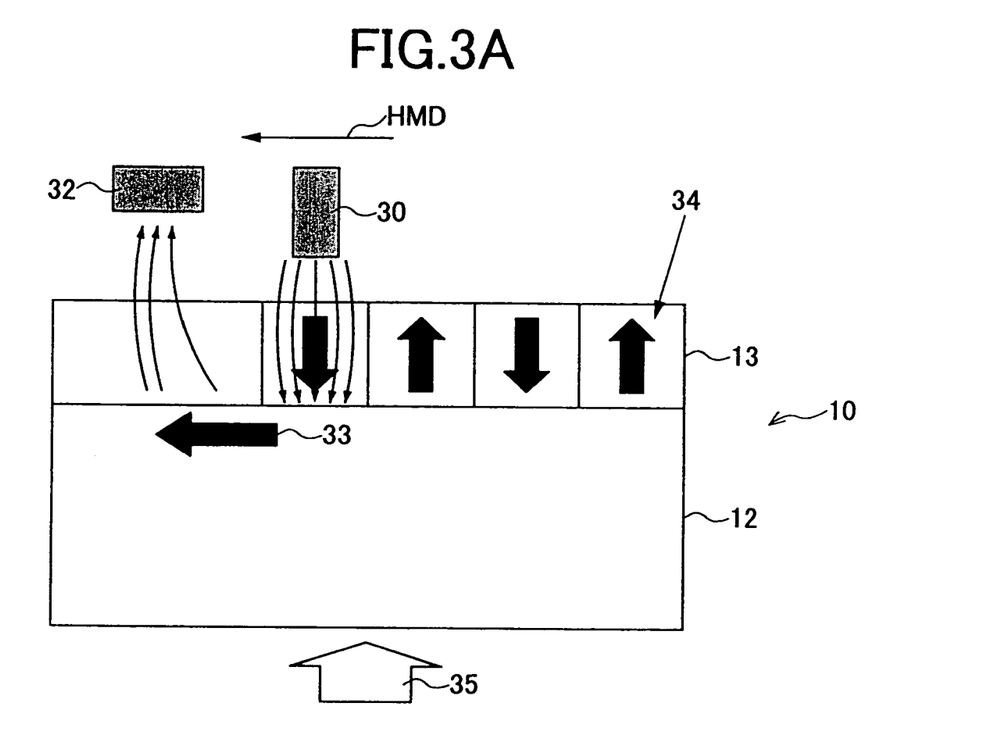
FIGS. 3A and 3B respectively show recording and reproducing of magnetic information by a magnetic head for the case the magnetic recording medium of the present invention is mounted inside a magnetic storage apparatus.
Figure 3B:
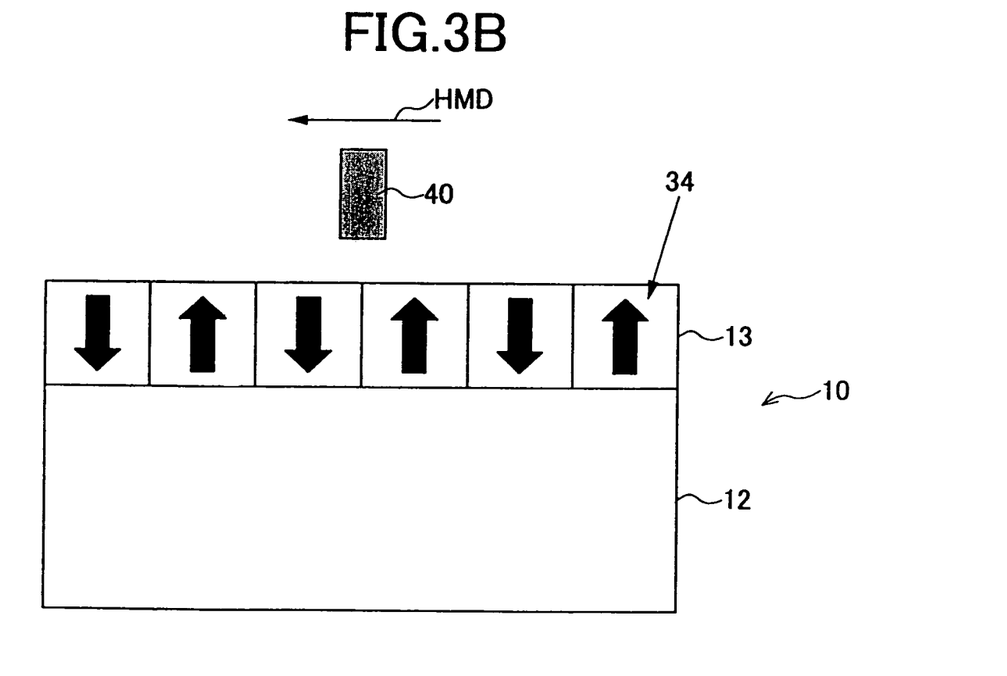

FIGS. 3A and 3B show the state in which the magnetic recording medium 10 is disposed inside the magnetic storage apparatus for recording and reproducing of magnetic information by the magnetism head, wherein FIG. 3A shows the state in which the magnetic information is recorded on magnetic recording layer 13 by a recording head 30 while FIG. 3B shows the state in which the magnetic information recorded in the magnetic recording layer 13 is reproduced by a reproducing head 40. In order to facilitate understanding of the fundamental construction, FIG. 3A and also FIG. 3B only show the primary part. Therefore, only the backing layer 12 and the magnetic recording layer 13 are shown for the magnetic recording medium 10.

In FIG. 3A, there is shown a situation in which a predetermined magnetic information is recorded on to the magnetic recording layer 13 by a single magnetic pole head 30 and a return yoke 32 moving relatively in the direction of an arrow HMD. The Backing layer 12 is heated by an optical beam 35 to the temperature higher than the compensation temperature $T_{comp}$. The backing layer 12 has a predetermined magnetization 33 in the in-plane direction and performs the original function of the backing layer of receiving the recording magnetic field 31 from the single magnetic pole head 30. With this, it becomes possible to record exact magnetic information 34 on the magnetic recording layer 13.

As shown in FIG. 3A, it is preferable to construct such that the magnetic flux entered into the backing layer 12 is circulated by a return yoke 32 provided ahead of the single magnetic pole head 30 in the HMD direction. Thereby, the magnetic flux entering the return yoke 32 crosses the magnetic recording layer 13, and recording of magnetic information is made in the magnetic recording layer 13 by the recording magnetic field 31 from the single magnetic pole head 30. With this, no error is incurred for the magnetic information.

Thus, the backing layer of the magnetic recording medium of the present invention is heated (or cooled) such that there appears a predetermined magnetization only when recording of magnetic information is made on to the magnetic recording layer.

On the other hand, FIG. 3B shows the case for reproducing magnetic information recorded in the magnetic recording layer 13. In this case, the backing layer 12 is not heated and has the temperature close to the compensation temperature $T_{comp}$. Therefore, the magnetization of the backing layer 12 is more or less zero, and the backing layer 12 does not become the cause of noise at the time of reproducing.

Figure 4:
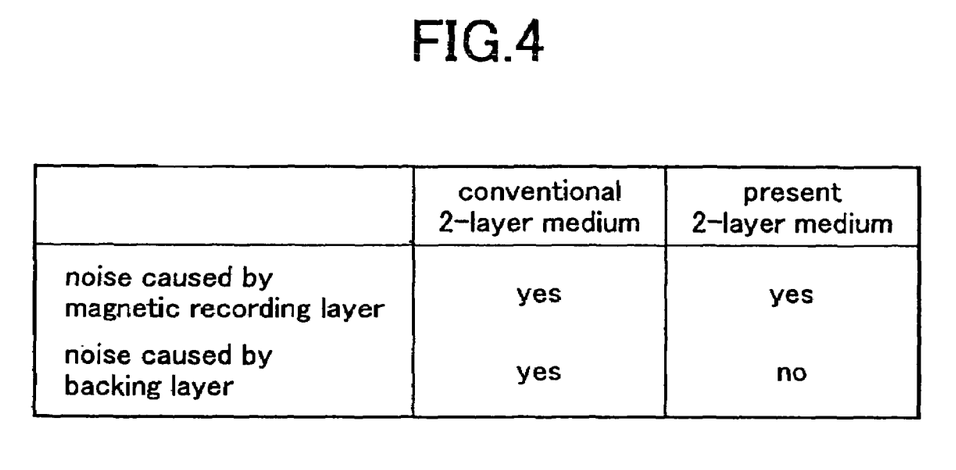
FIG. 4 is a diagram comparing the noise for the magnetic recording medium of conventional two-layer type and a magnetic recording medium of the present invention.

FIG. 4 compares the magnetic recording media of the two-layer type having a conventional backing layer and the magnetic recording medium of the present invention with regard to noise. As can be seen in FIG. 4, the magnetic recording medium of the present invention possesses superior characteristics of capable of suppressing the noise originating from the backing layer.

Figure 5:
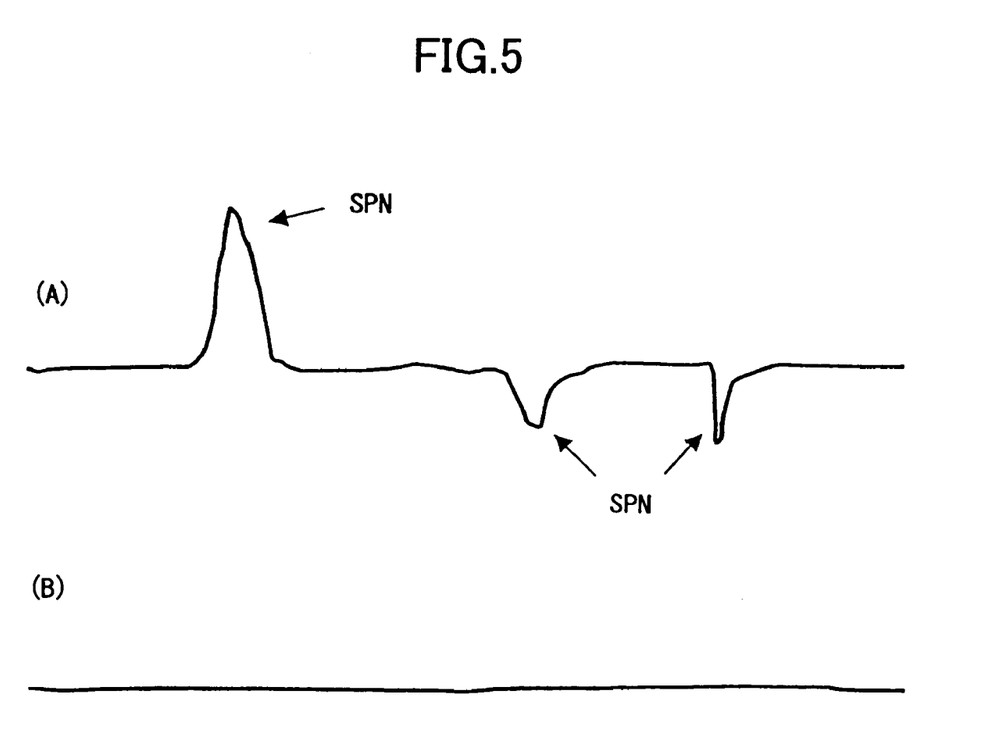
FIG. 5 is a diagram comparing the reproduced output waveform after DC-demagnitization from the conventional magnetic recording media of two-layer type and the reproduced output waveform after DC-demagnitization for the case the magnetic recording medium of the present inventions is used.

FIG. 5 compares the reproduced output waveform (A) after the DC demagnitization for the case of using a conventional two-layer type magnetic recording medium and a reproduced output waveform (B) after the DC demagnitization for the case of using the magnetic recording medium of the present invention. In the case (A) for the conventional backing layer (NiFe) shown in the upper row, it can be seen that there appears spike noise SPN originating from the backing layer having the magnetization at the time of reproducing. In the case (B) for the backing layer of the present invention using a ferrimagnetic material (GdFeCo) shown in the lower row, on the other hand, it is confirmed that the formation of the spike noise SPN is effectively suppressed.

Figure 6A:
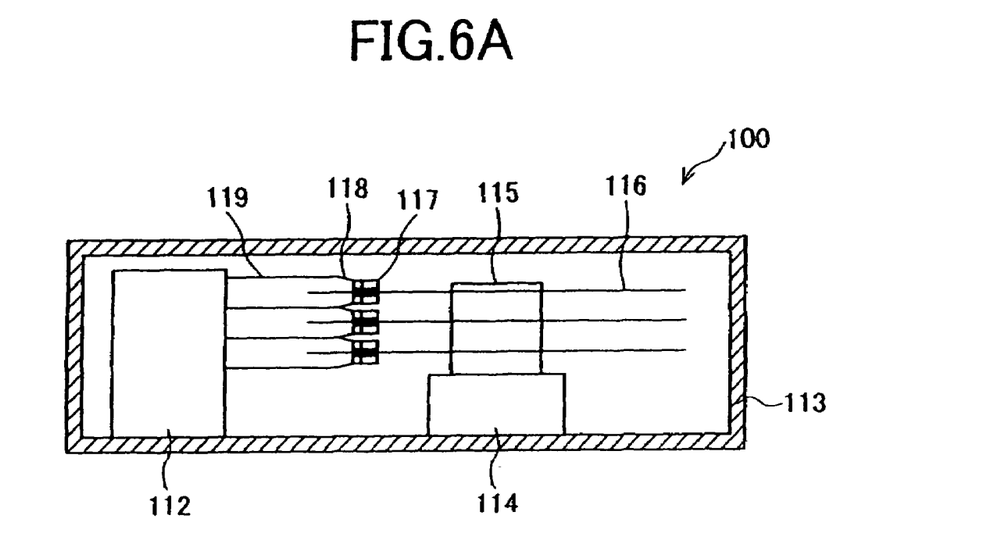
FIGS. 6A and 6B are diagrams respectively showing a cross-sectional view and a plan view of the main part of the magnetic storage apparatus of the present invention.
Figure 6B:
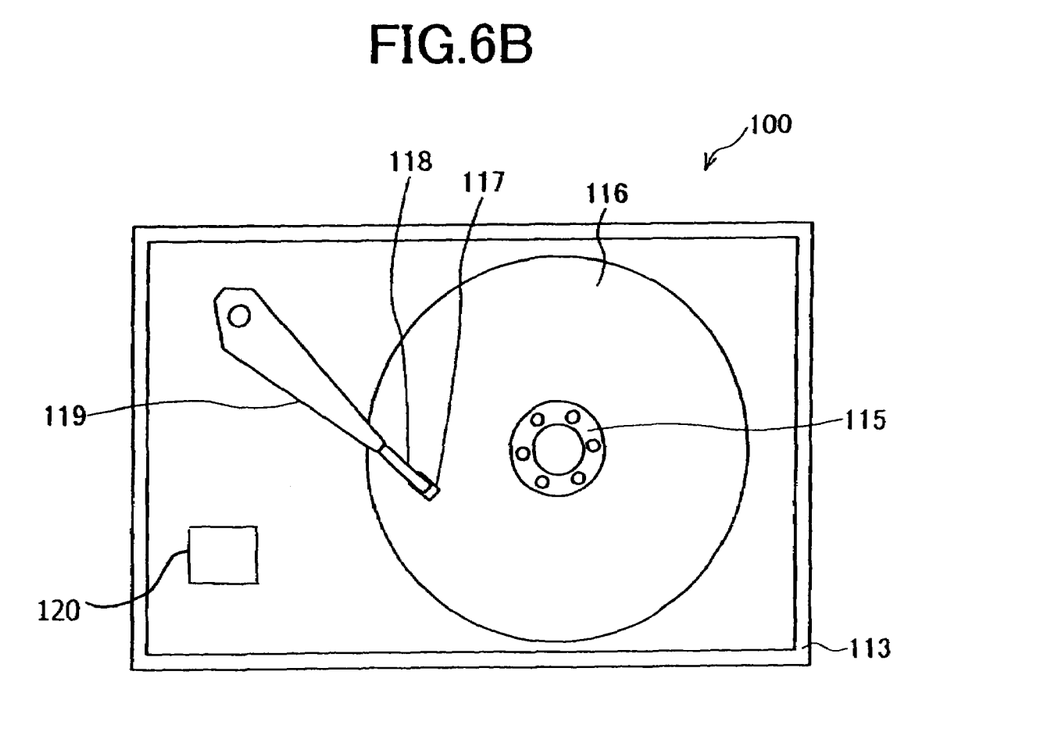

Hereinafter, explanation will be made on an embodiment of the magnetic storage apparatus of the present invention with reference to FIG. 6A and FIG. 6B, wherein FIG. 6A is a cross-sectional diagram showing a main part of the magnetic storage apparatus 100 of the embodiment while FIG. 6B is a plane view showing the main part of the same apparatus 100. Because explanation has already been made with regard to the magnetic recording medium mounted on a magnetic storage apparatus with reference to FIGS. 3A and 3B, only a brief description will be made here for the magnetic storage apparatus.

As shown in FIGS. 6A and 6B, the magnetic storage apparatus 100 is generally formed of a housing 113 accommodating therein a motor 114, a hub 115, a plurality of magnetic recording media 116, a plurality of record/reproducing heads 117, a plurality of suspensions 118, a plurality of arms 119 and further an actuator unit 112. Thereby the magnetic recording media 116 are mounted on the hub 115 rotated by the motor 114.

It should be noted that the record/reproducing head 117 is a magnetic head of composite type capable of performing recording and reproducing and is formed of a reproducing head of a high sensitivity resistance sensor that utilizes a magneto-resistance effect such as GMR, TMR, MR, and the like and a recording head of the single magnetic pole magnetic head, and the like. Each of the record/reproducing heads 117 is mounted at a tip end of a corresponding arm 119 via a suspension 118, and the arm 119 is driven by the actuator unit 112.

While not shown in FIG. 6, there is provided a heating means similar to the one shown in FIG. 3A inside the magnetic storage apparatus 100 for heating the magnetic recording medium by way of the optical beam.

By using the magnetic recording medium 10 or 20 of the perpendicular recording type having the construction explained with reference to FIG. 1, for the magnetic recording medium 116, noise caused by the backing layer is eliminated and it becomes possible to perform high density recording in the magnetic storage apparatus. Of course, the number of the magnetic recording media 116 may is not limited to three, but any of one, two, four or more magnetic recording media may be provided.

It should be noted that the fundamental construction of the magnetic storage apparatus 100 is not limited to the one shown in FIGS. 6A and 6B. Further, the magnetism storage medium used in the present invention is not limited to a magnetic disk.

Further, it is possible to construct the magnetic storage apparatus 100 such that the magnetic storage apparatus 100 includes therein a cooling means 120 cooling the magnetic recording medium such that the magnetic recording medium is cooled only at the time of recording such that there appears a magnetization in the backing layer only at the time of recording.

While explanation has been made heretofore with regard to preferred embodiments of the present invention, the present invention is not limited to such particular embodiments but various modifications and changes may be made within the scope of the present invention described in the claims.

The invention claimed is:

1. A magnetic storage apparatus for recording and reproducing magnetic information having a perpendicular magnetic recording medium, said perpendicular magnetic recording medium comprising at least a perpendicular magnetic recording layer and a backing layer backing said perpendicular magnetic recording layer, said backing layer having an in-plane magnetization, characterized in that said backing layer is formed of a ferrimagnetic material having a compensation temperature in the vicinity of a recording/reproducing temperature, said magnetic storage apparatus further comprises temperature changing means for heating or cooling said backing layer at the time of recording magnetic information to said perpendicular magnetic recording layer such that a temperature of said backing layer is moved away from said compensation temperature.

2. The magnetic storage apparatus as claimed in claim 1, characterized in that said temperature changing means of said backing layer comprises an optical heating mechanism heating said backing layer with an optical beam at the time of recording said magnetic information to said perpendicular magnetic recording layer.

3. The magnetic storage apparatus as claimed in claim 2, characterized in that a single magnetic pole magnetic head is used for a recording head for recording said magnetic information to said perpendicular magnetic recording layer.

4. The magnetic storage apparatus as claimed in claim 3, characterized by further comprising a return yoke for receiving said magnetic field of said recording head via said backing layer.

5. The magnetic storage apparatus as claimed in claim 1, characterized in that a single magnetic pole magnetic head is used for a recording head for recording said magnetic information to said perpendicular magnetic recording layer.

6. The magnetic storage apparatus as claimed in claim 5, characterized by further comprising a return yoke for receiving said magnetic field of said recording head via said backing layer.

7. The magnetic storage apparatus as claimed in claim 6, characterized in that a reproducing head is provided adjacent to said recording head for reproducing said magnetic information recorded in said perpendicular magnetic recording layer, said reproducing head uses a magneto-resistive sensor such as GMR, TMR, MR, and the like.

* * * * *